United States Patent
Mandal et al.

(10) Patent No.: US 12,210,146 B2
(45) Date of Patent: Jan. 28, 2025

(54) SCALABLE METHOD OF FABRICATING STRUCTURED POLYMERS FOR PASSIVE DAYTIME RADIATIVE COOLING AND OTHER APPLICATIONS

(71) Applicant: THE TRUSTEES OF COLUMBIA UNIVERSITY IN THE CITY OF NEW YORK, New York, NY (US)

(72) Inventors: Jyotirmoy Mandal, Chittagong (BD); Yuan Yang, New York, NY (US); Nanfang Yu, Fort Lee, NJ (US)

(73) Assignee: THE TRUSTEES OF COLUMBIA UNIVERSITY IN THE CITY OF NEW YORK, New York, NY (US)

(*) Notice: Subject to any disclaimer, the term of this patent is extended or adjusted under 35 U.S.C. 154(b) by 0 days.

(21) Appl. No.: 18/231,502

(22) Filed: Aug. 8, 2023

(65) Prior Publication Data
US 2024/0085690 A1 Mar. 14, 2024

Related U.S. Application Data (63) Continuation of application No. 16/770,277, filed as application No. PCT/US2018/064743 on Dec. 10, 2018, now Pat. No. 11,740,450.
(Continued)

(51) Int. Cl.
*G02B 26/00* (2006.01)
*C08J 9/28* (2006.01)
(Continued)

(52) U.S. Cl.
CPC ........... *G02B 26/004* (2013.01); *C08J 9/286* (2013.01); *C08K 5/0041* (2013.01); *C09D 5/004* (2013.01);
(Continued)

(58) Field of Classification Search
CPC ........ G02B 26/004; G02B 1/14; G02B 5/208; C08J 9/286; C08J 2301/12; C08J 2301/28;
(Continued)

(56) References Cited

U.S. PATENT DOCUMENTS

| 4,119,581 A | * | 10/1978 | Rembaum | ............. C08F 291/00 |
| | | | | 525/445 |
| 4,411,495 A | | 10/1983 | Beni et al. | |

(Continued)

FOREIGN PATENT DOCUMENTS

| WO | 2006068216 A1 | 6/2006 | |
| WO | 2014085151 A1 | 6/2014 | |
| WO | WO-2016044609 A1 * | 3/2016 | ......... A41D 13/0053 |

OTHER PUBLICATIONS

Dou et al.("Breath Figure Method for Construction of Honeycomb Films", Membranes 2015, pp. 399-424). (Year: 2015).*
(Continued)

*Primary Examiner* — David P Porta
*Assistant Examiner* — Fani Polyzos Boosalis
(74) *Attorney, Agent, or Firm* — Barclay Damon, LLP; Anthony P. Gangemi (57) ABSTRACT

A structured material is provided that includes a substrate and a porous structured polymer layer disposed thereon. The porous structured polymer layer includes a plurality of voids, and has a high hemispherical reflectance a high a hemispherical thermal emittance. The structured material is thus particularly advantageous for cool-roof coatings, enabling surfaces coated by the material to stay cool, even under strong sunlight. The material can be produced via
(Continued)

structuring of polymers in a mixture including a solvent and a non-solvent. Sequential evaporation of the solvent and the non-solvent provide a polymer layer with the plurality of voids.

20 Claims, 7 Drawing Sheets

Related U.S. Application Data (60) Provisional application No. 62/596,145, filed on Dec. 8, 2017.

(51) Int. Cl.

| | | |
|---|---|---|
| *C08K 5/00* | (2006.01) | |
| *C09D 5/33* | (2006.01) | |
| *E04D 7/00* | (2006.01) | |
| *E04D 13/00* | (2006.01) | |
| *E04F 13/08* | (2006.01) | |
| *E06B 9/24* | (2006.01) | |
| *G02B 1/14* | (2015.01) | |
| *G02B 5/20* | (2006.01) | |

(52) U.S. Cl.
CPC ............... *E04D 7/00* (2013.01); *E04D 13/00* (2013.01); *E04F 13/08* (2013.01); *E06B 9/24* (2013.01); *G02B 1/14* (2015.01); *G02B 5/208* (2013.01); *B32B 2305/026* (2013.01); *C08J 2301/12* (2013.01); *C08J 2301/28* (2013.01); *C08J 2325/06* (2013.01); *C08J 2327/06* (2013.01); *C08J 2327/14* (2013.01); *C08J 2327/20* (2013.01); *C08J 2383/04* (2013.01); *E06B 2009/2411* (2013.01); *E06B 2009/2417* (2013.01)

(58) Field of Classification Search
CPC ............... C08J 2325/06; C08J 2327/06; C08J 2327/14; C08J 2327/20; C08J 2383/04; C08K 5/0041; C09D 5/004; E04D 7/00; E04D 13/00; E04F 13/08; E06B 9/24; E06B 2009/2411; E06B 2009/2417
See application file for complete search history.

(56) References Cited

U.S. PATENT DOCUMENTS

| | | | | |
|---|---|---|---|---|
| 5,455,217 | A | * | 10/1995 | Chang .................... B41M 5/52 503/227 |
| 5,764,316 | A | | 6/1998 | Takizawa et al. |
| 6,628,355 | B1 | | 9/2003 | Takahara |
| 7,081,272 | B2 | | 7/2006 | Sasaki et al. |
| 7,171,095 | B2 | | 1/2007 | Sugita et al. |
| 11,396,586 | B1 | * | 7/2022 | Diest ...................... C08J 9/286 |
| 2006/0281018 | A1 | | 12/2006 | Tomaru |
| 2011/0222295 | A1 | | 9/2011 | Weber et al. |
| 2013/0180657 | A1 | * | 7/2013 | Kelsey .................. B32B 27/322 156/278 |
| 2013/0335807 | A1 | * | 12/2013 | Arsenault ............. G02F 1/0128 264/2.7 |
| 2014/0030277 | A1 | * | 1/2014 | Rubin-Bejerano .... A61K 47/61 424/178.1 |
| 2015/0277012 | A1 | | 10/2015 | Nakamura et al. |
| 2021/0002491 | A1 | | 1/2021 | Xu et al. |

OTHER PUBLICATIONS

International Search Report and The Written Opinion of the International Searching Authority, International Application No. PCT/US2018/064788, mailed Feb. 21, 2019.

Tian, X., et al., "Poly(vinylidene fluoride-co-hexafluoropropene) (PVDF-HFP) membranes for ethyl acetate removal from water," Journal of Hazardous Materials, vol. 153, pp. 128-135, 2008.

Dou, Y., et al., "Breath Figure Method for Construction of Honeycomb Films," Membranes, vol. 5, pp. 399-424, May 2015.

International Search Report and The Written Opinion of the International Searching Authority, International Application No. PCT/US2018/064743, mailed Feb. 21, 2019.

* cited by examiner

SCALABLE METHOD OF FABRICATING STRUCTURED POLYMERS FOR PASSIVE DAYTIME RADIATIVE COOLING AND OTHER APPLICATIONS

CROSS REFERENCE TO RELATED APPLICATION(S)

This application is a continuation of U.S. Utility patent application Ser. No. 16/770,277, filed Jun. 5, 2020, which is a national stage filing of International Patent Application No. PCT/US2018/064743, filed Dec. 10, 2018, which claims the benefit of U.S. Provisional Application No. 62/596,145, filed Dec. 8, 2017, each of which are incorporated by reference as if disclosed herein in its entirety.

TECHNICAL FIELD

The present disclosure relates to the field of polymer coatings and to the field of solar-reflective coating materials.

BACKGROUND

For a variety of reasons, including, e.g., cost and environmental impact, there are many ongoing efforts to reduce energy usage through building materials that possess beneficial solar reflectance and thermal emittance characteristics. Such materials, however, may not be aesthetically pleasing, may also be difficult and/or expensive to manufacture, and may not always have suitable solar reflectance or thermal emittance characteristics. Accordingly, there is a long-felt need in the art for materials that possess beneficial solar reflectance characteristics while also having suitable thermal emissivity properties.

SUMMARY

In meeting the long-felt needs described above, the present disclosure first provides a structured material including a porous structured polymer layer. In some embodiments, the polymer layer includes a plurality of voids disposed therein, and has a hemispherical reflectance of from about 50% to about 99% for radiation having a wavelength of from about 0.35 to about 2.5 micrometers, as well as a room temperature hemispherical thermal emittance of at least 75% for radiation having a wavelength of from about 8 to about 13 micrometers or longer.

Additionally disclosed are methods of forming the structured material, including disposing a mixture including a polymer, a solvent, and a non-solvent onto a substrate and sequentially evaporating the solvent and the non-solvent to produce a structured porous polymer coating atop the substrate.

Additionally disclosed are methods of forming the structured material, including disposing a mixture including a polymer, a solvent, and a non-solvent onto a substrate and removal of the solvent by dilution with additional non-solvent, and subsequent evaporation of the non-solvent to produce a structured porous polymer coating atop the substrate.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1A:
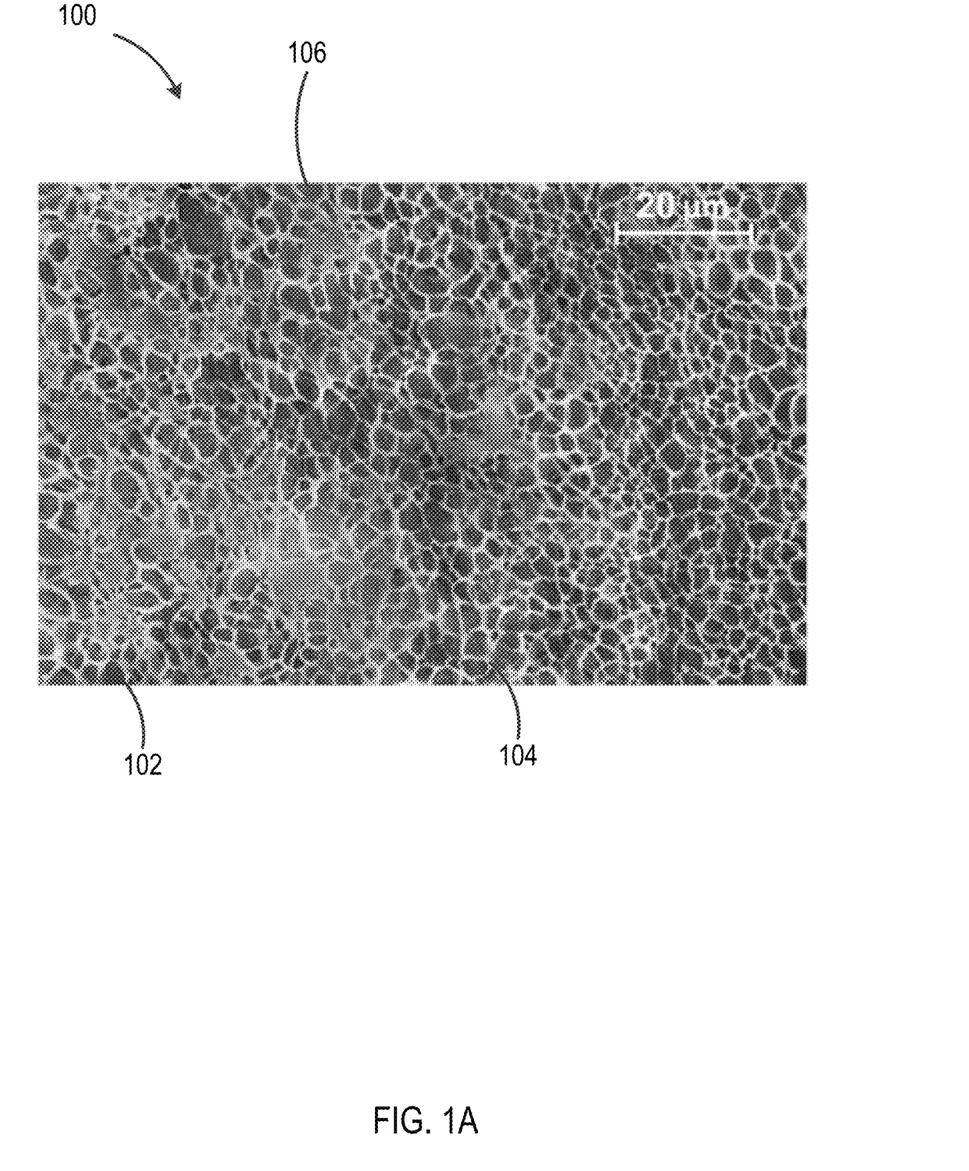
FIG. 1A is an image of a structured material according to some embodiments of the present disclosure.
Figure 1B:
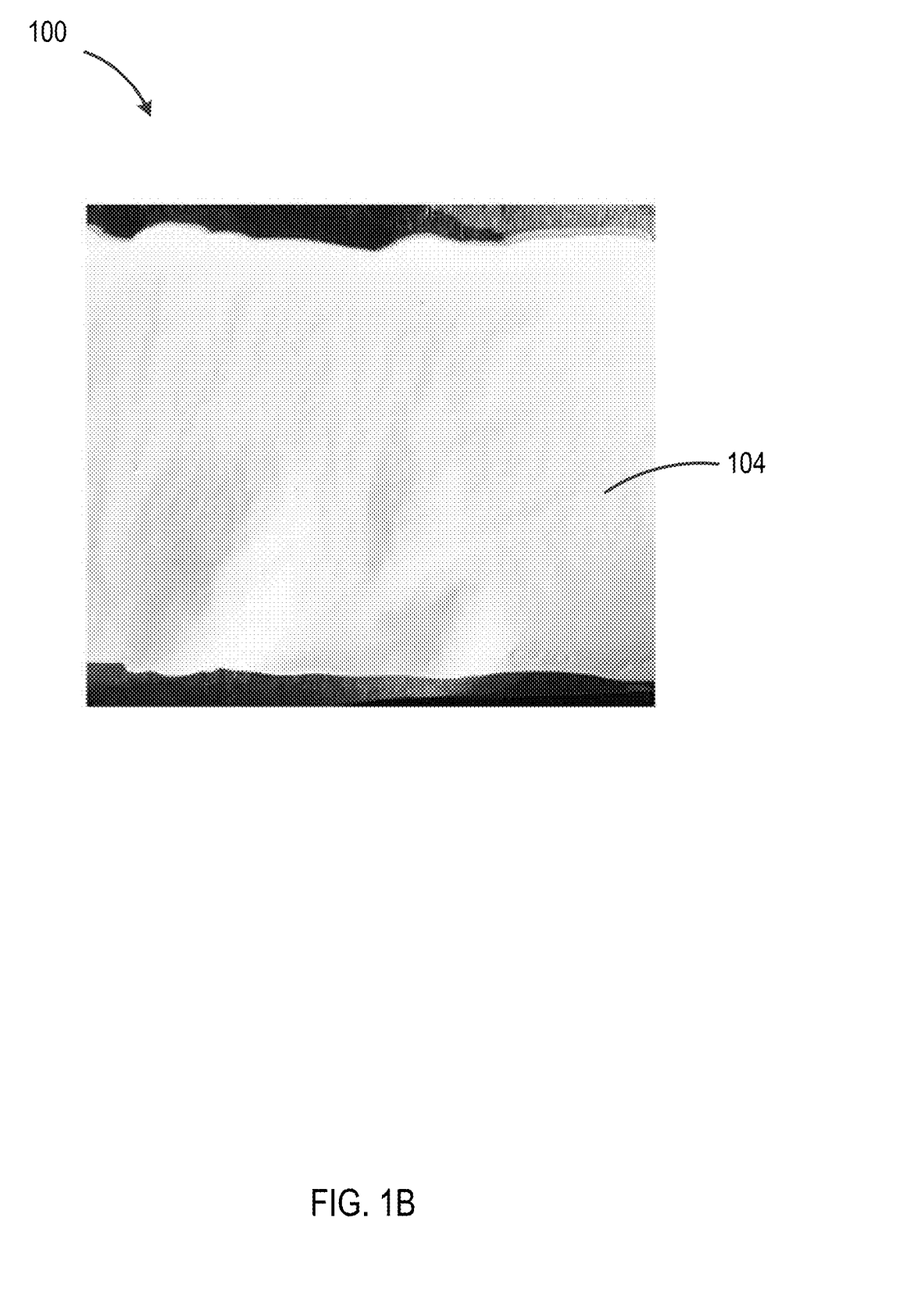
FIG. 1B is an image of a structured material according to some embodiments of the present disclosure.
Figure 1C:
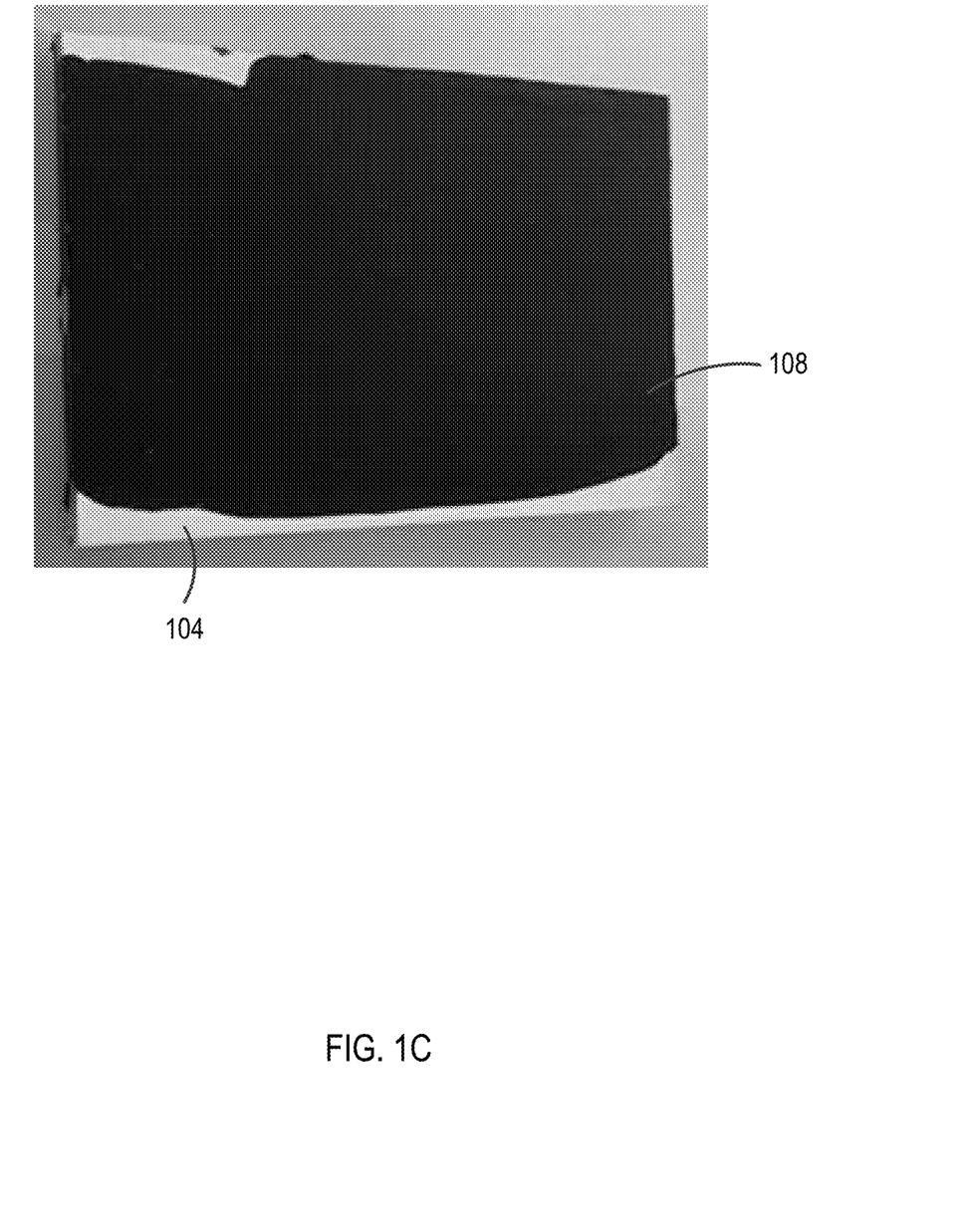
FIG. 1C is an image of a structured material according to some embodiments of the present disclosure.
Figure 1D:
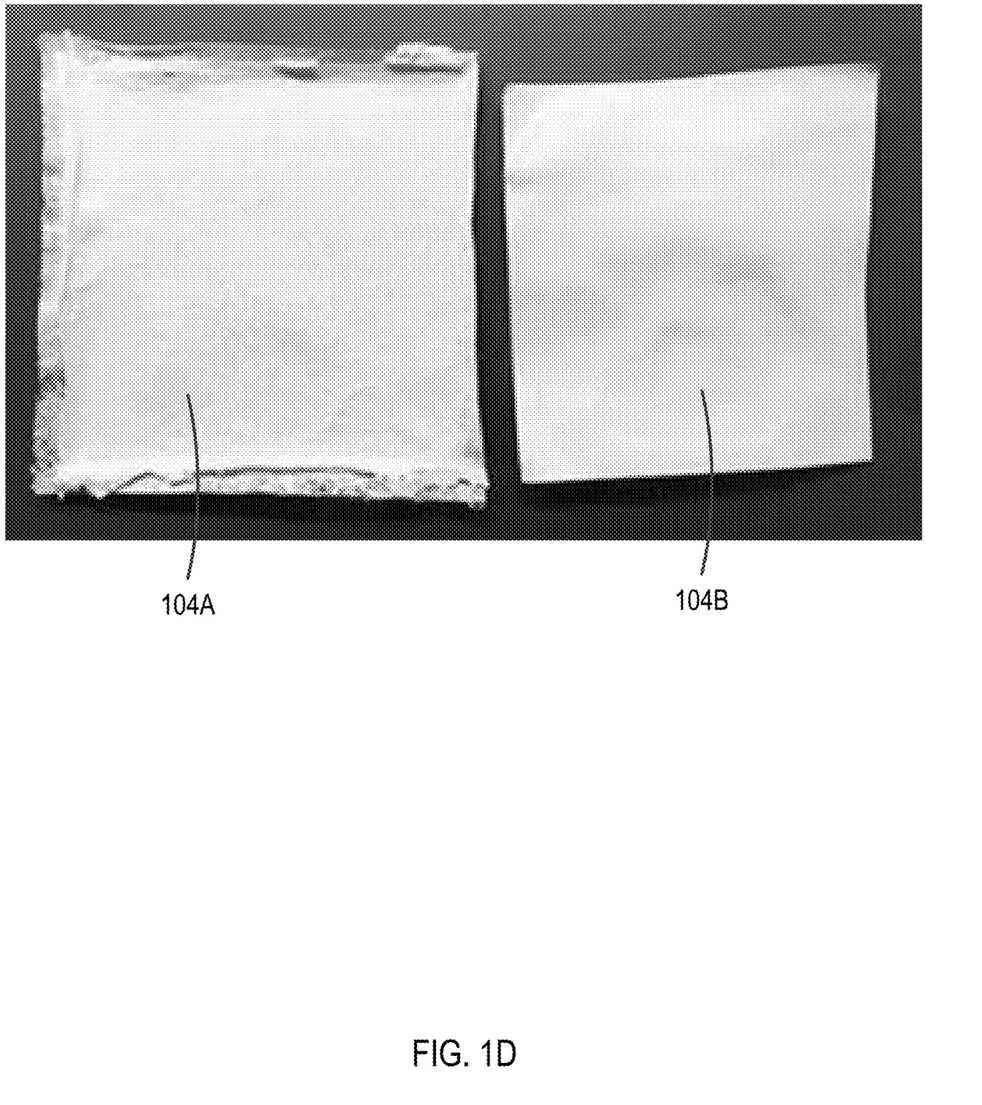
FIG. 1D is an image of a structured material according to some embodiments of the present disclosure.

Referring now to FIG. 1A, some aspects of the disclosed subject matter include a structured material 100 including a substrate 102 and a polymer layer 104. In some embodiments, substrate 102 is a building material, glass, plastic, metal, textile, siding, roofing, decking, or combinations thereof. In some embodiments, substrate 102 is light-permeable. In some embodiments, substrate 102 is flexible. In some embodiments, polymer layer 104 is a porous structured polymer layer including a plurality of voids 106. In some embodiments, polymer layer 104 is freestanding and/or self-supporting. In some embodiments, polymer layer 104 is flexible. Polymer layer 104 has a high hemispherical reflectance of light in the solar wavelengths, i.e., about 0.35 micrometers to about 2.5 micrometers. In some embodiments, the hemispherical reflectance of polymer layer 104 is from about 50% to about 99% in the solar wavelengths. In some embodiments, the hemispherical reflectance of polymer layer 104 is from about 78 to 95%, from about 81% to about 93%, from about 83% to about 90%, from about 85% to about 89%, or about 87% in the solar wavelengths. Polymer layer 104 also has a high hemispherical emittance in the thermal wavelengths, i.e., greater than about 7 micrometers). In some embodiments, the hemispherical thermal emittance of polymer layer 104 is at least about 75% for radiation having a wavelength from about 8 to about 13 micrometers or longer. In some embodiments, the hemispherical thermal emittance of polymer layer 104 is at least about 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or even about 99% for radiation having a wavelength from about 8 to about 13 micrometers or longer. In some embodiments, polymer layer 104 has a hemispherical reflectance from about 50% to about 99% and a hemispherical thermal emittance of at least about 75%. In some embodiments, polymer layer 104 has a hemispherical reflectance from about 75% to about 99% and a hemispherical thermal emittance of at least about 75%. Referring now to FIG. 1B, in some embodiments, polymer layer 104 has a bright white appearance under typical lighting conditions. Polymer layer 104 effectively scatters light ranging from the solar to thermal wavelengths. For example, in the solar wavelengths (e.g., 0.35-2.5 micrometers), where the polymer has negligible intrinsic absorption, this may result in back-scattering and high reflectivity, which can result in a white appearance of the film. At the same time, in the thermal wavelengths (e.g., 2.5-40 micrometers) where the polymer is intrinsically absorptive or emissive, this can lead to a high absorbance (black appearance) or emittance (glowing appearance) for the film. The structure can also introduce a refractive index gradient and lower the effective refractive index of the layer for longer thermal wavelengths, reducing the reflection of light and further enhancing the absorbance or emittance. In some embodiments, polymer layer 104 includes a colorant, such as a dye or pigment. In some embodiments, the colorant is a visible dye, infrared reflective dye, visible pigment, infrared reflective pigment, or combinations thereof. In some embodiments, the colorant is one or a combination of sudan blue, brilliant blue FCF, unisol blue, indigo carmine, sudan yellow, yellow 5, hansa yellow, titanium dioxide white, zinc oxide white, paliogen black, and chromium iron oxide black. In some embodiments, the colorant absorbs only a desired wavelength of light, e.g., blue and green if red color is desired, or green and red if blue is desired, and not others. In some embodiments, the colorant does not absorb the infrared component of the solar wavelengths, i.e., 0.7 to 2.5 micron. In some embodiments, polymer layer 104 includes additives to enhance mechanical strength. Referring now to FIG. 1C, in some embodiments, polymer layer 104 has an additional top-coating 108. In some embodiments, top-coating 108 includes one or more colorants. In some embodiments, top-coating 108 includes a material that provides protection from weather or moisture. Referring now to FIG. 1D, in some embodiments, polymer layer 104 is deployed as a coating 104A on substrates, e.g., copper, as a freestanding sheet 104B suitable for use as fabrics or tarpaulins, or combinations thereof.

In some embodiments, polymer layer 104 includes poly (vinylidene difluoride), poly(vinylidene difluoride-co-hexafluoropropene), poly(methyl methacrylate), poly(vinyl chloride), poly(vinyl fluoride), poly(styrene), poly(dimethyl siloxane), poly(vinyl alcohol), ethyl-cellulose, methyl-cellulose, cellulose acetate, or combinations thereof. In some embodiments, polymer layer 104 has a thickness between 50 micrometers to 2 mm. In some embodiments, polymer layer 104 has a thickness between 200 micrometers to 400 micrometers. In some embodiments, voids 106 have cross-sectional dimensions of less than 2 micrometers. In some embodiments, voids 106 have cross-sectional dimensions between 20 nm to 700 nm. In some embodiments, voids 106 have cross-sectional dimensions between about 20 to about 700 nm, between about 30 to about 670 nm, between about 40 to about 630 nm, between about 60 to about 600 nm, between about 80 to about 580 nm, between about 100 to about 550 nm, between about 150 to about 520 nm, between about 180 to about 490 nm, between about 200 to about 470 nm, between about 220 to about 440 nm, between about 250 to about 410 nm, between about 270 to about 380 nm, between about 290 to about 350 nm, between about 310 to about 340 nm, or about 330 nm. In some embodiments, voids 106 have cross-sectional dimensions between 3 micrometers to 20 micrometers. In some embodiments, voids 106 have cross-sectional dimensions between 5 micrometers to about 10 micrometers. In some embodiments, voids 106 have cross-sectional dimensions of about 5 about 6 about 7 about 8 about 9 or about 10 In some embodiments, voids 106 have cross-sectional dimensions of less than 2 micrometers and between 3 micrometers to 20 micrometers. Without wishing to be bound by theory, relatively smaller voids, e.g., less than about 2 micrometers in cross-section) more efficiently scatter smaller wavelengths of radiation while larger voids, e.g., from about 3 to about 20 micrometers more efficiently scatter larger wavelengths, so a polymer layer 104 including both the smaller and larger voids 106 should lead to more efficient radiative cooling performance.

Figure 2:
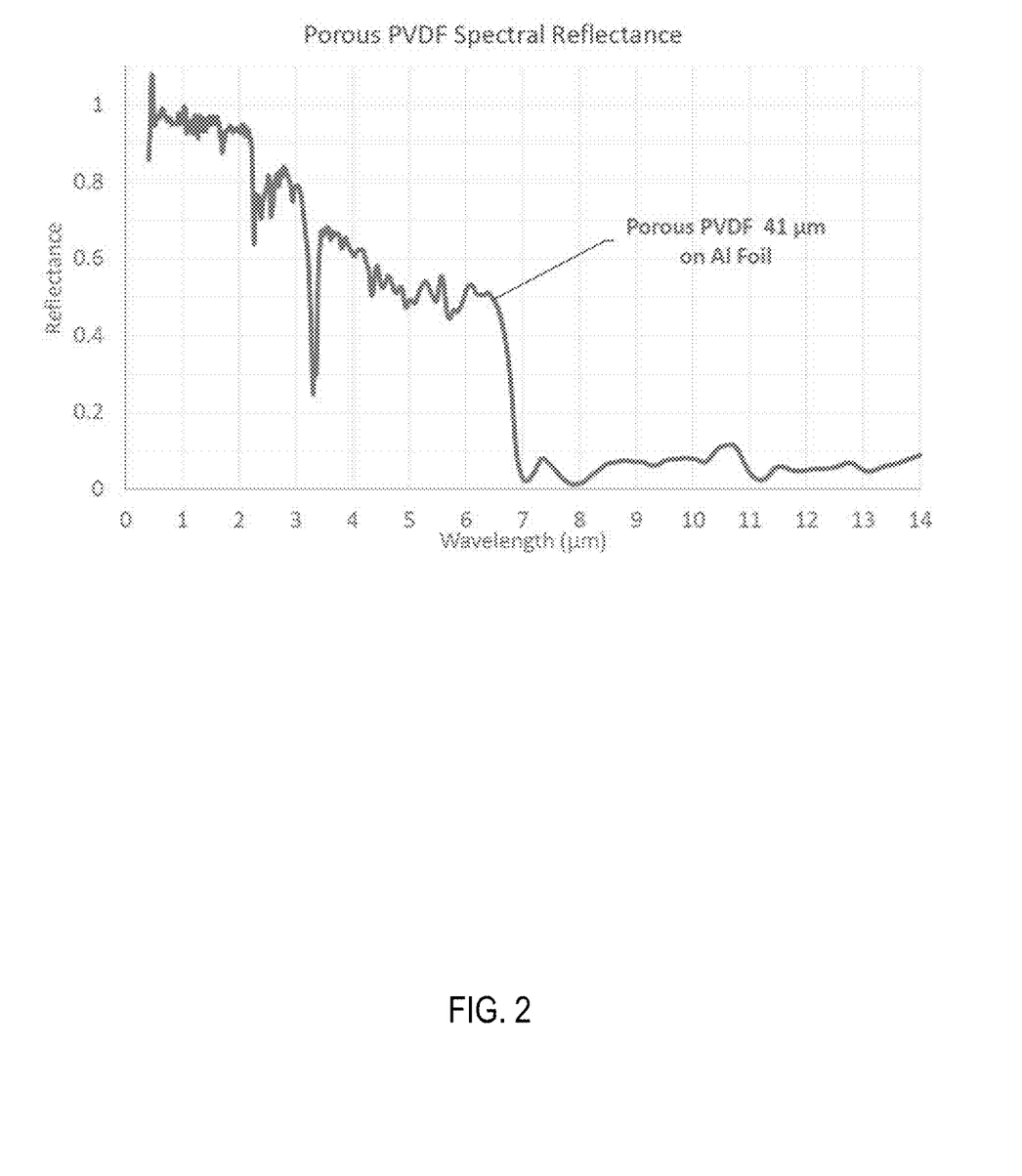
FIG. 2 is a graph showing variation of spectral reflectance of a structured material according to some embodiments of the present disclosure.

Referring now to FIG. 2, high reflectance and thermal emittance was demonstrated for a poly(vinylidene difluoride-co-hexafluoropropene) foam film according to some embodiments of the present disclosure. The graph portrays the variation in spectral reflectance (i.e., [1−spectral emittance]) as a function of wavelength. As shown, the reflectance is high (>90%) in the solar wavelengths, i.e., about 0.35 micrometers to about 2.5 micrometers, and the emittance is high in the thermal wavelengths (i.e., greater than about 7 micrometers. This leads to an efficient radiative cooling performance for the film, as the film is reflective of solar radiation and also emits heat efficiently in the thermal wavelengths.

Figure 3A:
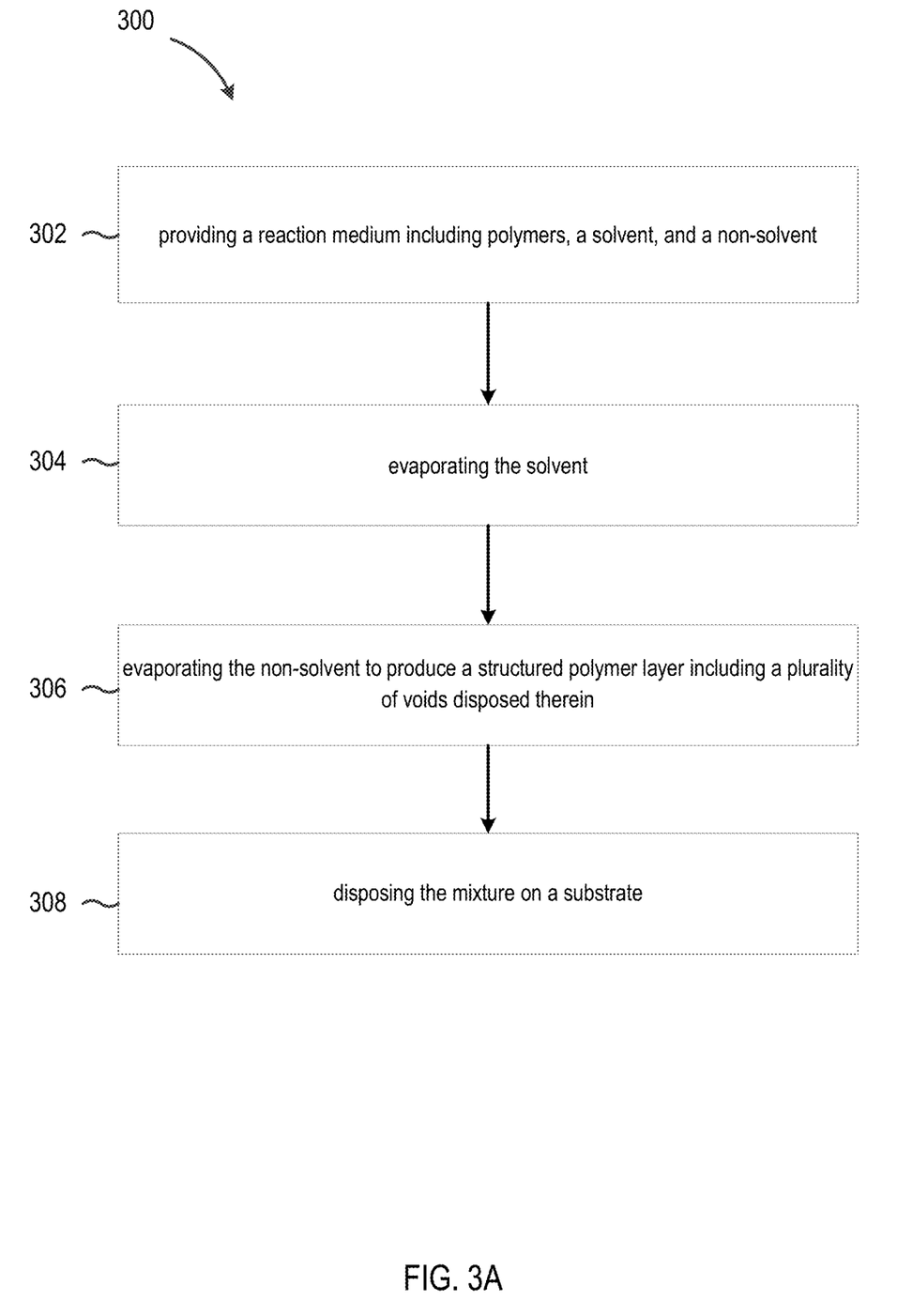
FIG. 3A is a chart of a method of making a structured material according to some embodiments of the present disclosure.
Figure 3B:
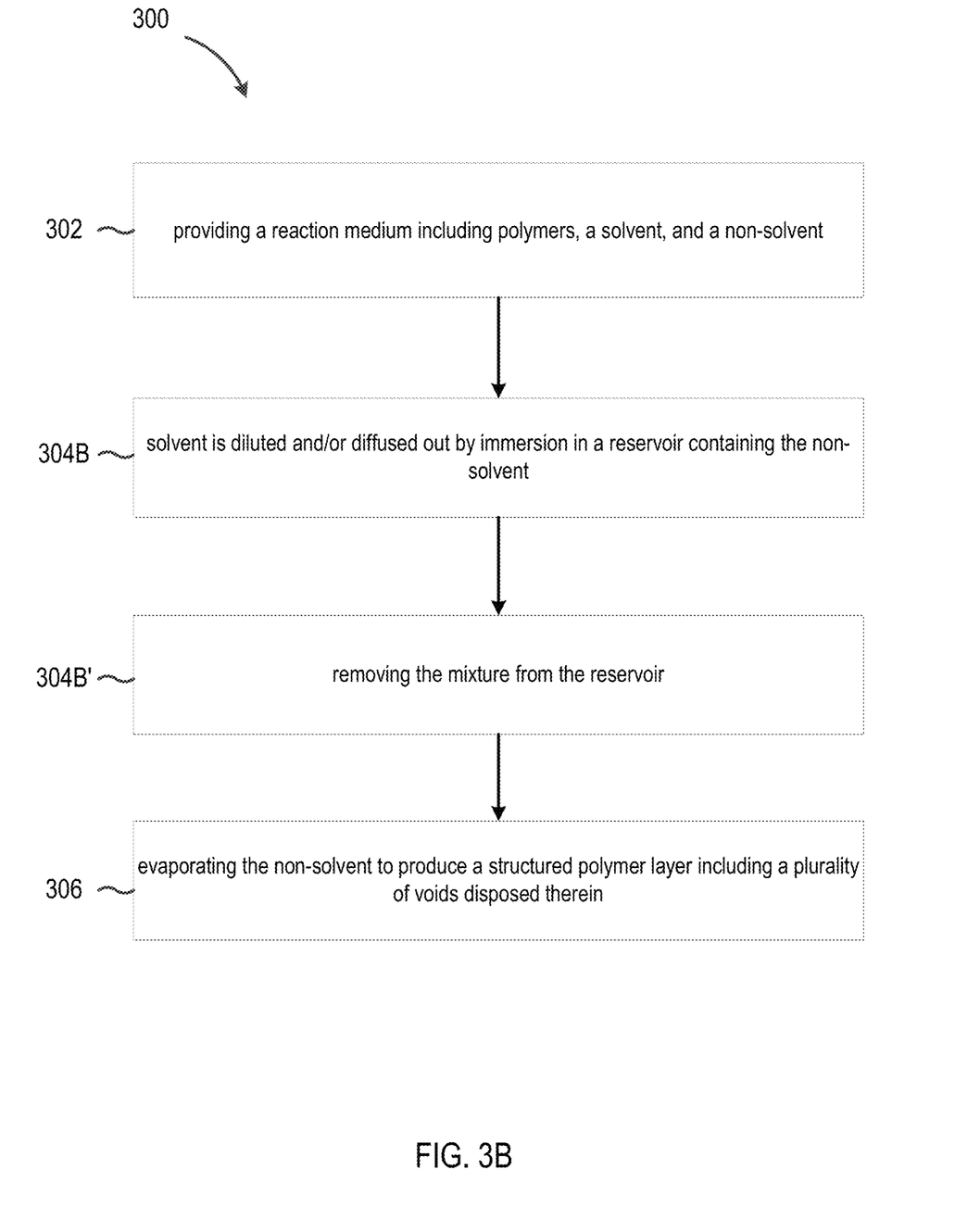
FIG. 3B is a chart of a method of making a structured material according to some embodiments of the present disclosure.

Referring now to FIG. 3A, some embodiments of the present disclosure are directed to a method of forming a structured material. In some embodiments, at 302, a mixture including polymers, a solvent, and a non-solvent is, e.g., made into a layer. At 304A, the solvent is evaporated. Referring now to FIG. 3B, in some embodiments, at 304B, the solvent is diluted and/or diffused out by immersion in a reservoir containing the non-solvent, followed by removal of the mixture from the reservoir at 3043. Referring again to FIG. 3A, at 306, the non-solvent is evaporated. In some embodiments, the non-solvent is evaporated 306 after the solvent is evaporated 304. In some embodiments, after completion of the above-identified steps, a structured polymer layer including a plurality of voids disposed therein is produced. At 308, the structured polymer layer is disposed on a substrate. In some embodiments, the mixture is disposed on the substrate, e.g., via spraying, painting, or dipping, and the steps 302-308 are each allowed to proceed in situ to apply the structured polymer layer to the substrate.

Without being bound to any particular theory, during the drying process, the solvent evaporates first, causing the polymer and the non-solvent to form separate phases. Eventually, the non-solvent also evaporates, leaving air in its place. The result is a layer of structured polymer, with the morphology and porosity of the layer being tunable by, e.g., the choices of polymer, molecular weight of the polymer, ambient temperature, solvent, and non-solvent and their mass ratios.

In some embodiments, the solvent includes acetone, tetrahydrofuran, methanol, ethanol, propanol, isopropanol, hexane, benzene, toluene, or combinations thereof. In some embodiments, the non-solvent includes water, methanol, ethanol, propanol, isopropanol, or combinations thereof. In some embodiments, the mass ratio of the solvent (X) to polymer (Y) to non-solvent (Z) in the mixture is $X>0.5$, $0.5<Y<1.25$, and $0.5<Z<1.25$. In some embodiments, the mass ratio of the solvent (X) to polymer (Y) to non-solvent (Z) in the mixture is $X>4$, $0.5<Y<1.25$, and $0.5<Z<1.25$. In some embodiments, the mass ratio of the solvent (X) to polymer (Y) to non-solvent (Z) in the mixture is $X>6$, $0.5<Y<1.25$, and $0.5<Z<1.25$.

Methods of the present disclosure advantageously provide a porous polymer layer that can be deposited on wide variety of substrates and has a large scattering of light, resulting in a reflective film. As the optical properties provided by the composition and the voids of the polymer layer provide high reflectance and emittance, the layers are particularly advantageous for cool-roof coatings, enabling surfaces coated by the film to stay cool, even under strong sunlight. The performance of the layers is also tunable via addition of visible and infrared dyes to change the spectral absorbance.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A composition, comprising:
    an amount of a pore-forming agent, the pore-forming agent being curable to form a structure having a plurality of voids therein and arranged to facilitate reflecting solar radiation away from a surface covered by the structure and dissipate heat by thermal radiation;
    a polar species; and
    a non-polar species,
    wherein the distribution of the pore-forming agent, the polar species, and the non-polar species in the composition is homogenous.

2. The composition of claim 1, wherein the pore-forming agent comprises any one or more of poly(vinylidene difluoride), poly(vinylidene difluoride-co-hexafluoropropene), poly(methyl methacrylate), poly(vinyl chloride), poly(vinyl fluoride), poly(styrene), poly(dimethyl siloxane), poly(vinyl alcohol), ethyl-cellulose, methyl-cellulose, and cellulose acetate.

3. The composition of claim 2, wherein the pore-forming agent comprises poly(vinylidene difluoride-co-hexafluoropropene).

4. The composition of claim 1, wherein the structure is white in appearance.

5. The composition of claim 1, further comprising a colorant.

6. The composition of claim 1, wherein the polar species comprises at least one of water and ethanol.

7. The composition of claim 1, wherein the voids have cross-sectional dimensions of less than 2 micrometers.

8. The composition of claim 1, wherein the voids have cross-sectional dimensions between 20 nm to 700 nm.

9. The composition of claim 1, wherein the voids have cross-sectional dimensions of from about 3 to about 20 micrometers.

10. The composition of claim 1, wherein the structure is adapted to radiate heat at a wavelength of from about 8 to about 13 micrometers.

11. A method, comprising applying a composition according to claim 1 to a surface.

12. The method of claim 11, wherein the applying comprises any one or more of spraying, painting, and dipping.

13. The method of claim 12, wherein the applying comprises spraying.

14. The method of claim 11, further comprising curing the composition so as to form the structure.

15. The method of claim 11, wherein the voids have cross-sectional dimensions of less than 2 micrometers.

16. The method of claim 11, wherein the voids have cross-sectional dimensions between 20 nm to 700 nm.

17. The method of claim 11, wherein the voids have cross-sectional dimensions of from about 3 to about 20 micrometers.

18. The method of claim 11, wherein the structure is adapted to radiate heat at a wavelength of from about 8 to about 13 micrometers.

19. A method, comprising: applying a composition comprising a pore-forming agent, a second species, and a third species to a substrate and effecting removal of the second species and the third species so as to give rise to a structure having a plurality of voids therein and arranged to facilitate reflecting solar radiation away from a surface covered by the structure and dissipate heat by thermal radiation,
    wherein the second species is a polar species,
    wherein the third species is a non-polar species, and
    wherein the distribution of the pore-forming agent, the second species, and the third species in the composition is homogenous.

20. The method of claim 1, wherein the voids have cross-sectional dimensions between 20 nm to 700 nm.

\* \* \* \* \*